Patented Dec. 23, 1924.

1,520,366

UNITED STATES PATENT OFFICE.

ADAM OSER, OF LYON, FRANCE, ASSIGNOR TO SOCIETE CHIMIQUE DES USINES DU RHONE, OF PARIS, FRANCE.

COMPRESSED VANILLIN TABLET.

No Drawing. Application filed February 8, 1922. Serial No. 535,080.

*To all whom it may concern:*

Be it known that I, ADAM OSER, residing at Lyon, France, a Swiss citizen, have invented certain new and useful Improvements in Compressed Vanillin Tablets, of which the following is a specification.

This invention relates to a compressed alimentary product and has for its object to provide compressed tablets of vanillin, adapted to be used for flavouring.

Vanillin, which constitutes the active principle of the vanilla pods has been used for a long time in the manufacture of alimentary products, and particularly in the manufacture of biscuits and of chocolate.

In the household, however, its use is almost unknown. Vanillin, as a matter of fact, is very little soluble, and its flavouring properties are so marked that it is difficult to find the suitable dose without special knowledge. As an excess of vanillin destroys the flavour and imparts a bitter taste, disappointment and even prejudice against the vanillin itself has been the result, and no use has been made of it.

It has been attempted to incorporate the vanillin with sugar, but the vanillin-sugar so obtained is difficult to use, for no kitchen is equipped to weigh the small quantities needed in practice.

On the other hand, it has been proposed to mix the vanillin with a neutral powder, such, for example, as flour or sugar or carbonate of soda, and to form solid pieces from this mixture by pressing or moulding. It has however been found that pieces obtained in this manner do not disintegrate in the water, so that the vanillin does not dissolve. Flours, for instance, contain invariably gluten and other nitrogenous matters, owing to which a paste of flour and water exhibits cohesive properties which prevent the bursting of tablets manufactured with flour.

According to the present invention, all the difficulties are eliminated by supplying vanillin in the form of compressed tablets, each of which contains an exact quantity of vanillin, mixed with a substance adapted to swell in water such as pure starch and cellulose, said substance being without noxious action on the vanillin or on the human body, such as starch.

Tablets made in this manner will immediately burst in water and the liberated vanillin, in a fine state of division will dissolve at once.

What I claim and desire to secure by Letters Patent is:—

1. A process of preparing doses of vanillin for culinary purposes, which consists in mixing a definite quantity of vanillin with a substance adapted to swell in water, said substance being without noxious action on the vanillin or on the human body, and compressing the mixture into tablets.

2. A process of preparing doses of vanillin for culinary purposes, which consists in mixing a definite quantity of vanillin with starch, and compressing the mixture into tablets.

In testimony whereof I have signed my name to this specification.

ADAM OSER.

Witness:
JULIAN KEMBLE FRIEDBERG.